(12) United States Patent
Kim

(10) Patent No.: US 10,918,096 B2
(45) Date of Patent: Feb. 16, 2021

(54) CENTRIFUGAL BRAKING SYSTEM FOR BAITCAST FISHING REELS

(71) Applicant: W.C. Bradley/Zebco Holdings, Inc., Tulsa, OK (US)

(72) Inventor: Hyunkyu Kim, Broken Arrow, OK (US)

(73) Assignee: W.C. BRADLEY/ZEBCO HOLDINGS, INC., Tulsa, OK (US)

( * ) Notice: Subject to any disclaimer, the term of this patent is extended or adjusted under 35 U.S.C. 154(b) by 350 days.

(21) Appl. No.: 16/031,779

(22) Filed: Jul. 10, 2018

(65) Prior Publication Data

US 2019/0014765 A1 Jan. 17, 2019

Related U.S. Application Data

(60) Provisional application No. 62/531,163, filed on Jul. 11, 2017.

(51) Int. Cl.
*A01K 89/01* (2006.01)
*A01K 89/033* (2006.01)
*A01K 89/015* (2006.01)

(52) U.S. Cl.
CPC .......... *A01K 89/056* (2015.05); *A01K 89/015* (2013.01)

(58) Field of Classification Search
CPC ........ A01K 89/01557; A01K 89/01555; A01K 89/056
See application file for complete search history.

(56) References Cited

U.S. PATENT DOCUMENTS

| 4,376,614 | A | * | 3/1983 | Woodruff ............... B64C 11/385 188/71.1 |
|---|---|---|---|---|
| 4,917,321 | A | | 4/1990 | Roberts |
| 5,782,420 | A | | 7/1998 | Forslund et al. |
| 5,950,949 | A | | 9/1999 | Cockerham |
| 5,984,221 | A | | 11/1999 | Kim |
| 6,086,005 | A | | 7/2000 | Kobayashi et al. |
| 6,168,106 | B1 | | 1/2001 | Cockerham |
| 6,371,396 | B1 | | 4/2002 | Kawasaki |
| 6,422,498 | B1 | | 7/2002 | Littau et al. |

(Continued)

OTHER PUBLICATIONS

ISA/US, International Search Report for PCT/US2018/041484, dated Oct. 29, 2018.

*Primary Examiner* — Emmanuel M Marcelo
(74) *Attorney, Agent, or Firm* — James F. Lea, III; Gable Gotwals

(57) ABSTRACT

A fishing reel centrifugal brake assembly is keyed to a spool. The assembly retains slidable brake shoes that extend to contact a ring and speed adjust shoes that extend to contact a conical surface. Brake shoe channels are received on brake assembly rails. Speed adjust shoes apply centrifugal force against the conical surface to move the assembly axially when rotated. The brake assembly is urged away from the brake ring and towards the spool at lower rotational speeds. Braking resulting from brake shoes/brake ring contact is adjustable by a control dial that defines a camming surface that moves the brake ring axially to position a smaller or larger diameter portion of the brake ring adjacent to the brake shoes. Frame springs press the brake ring against the camming surface. A brake spring retainer maintains frame spring orientation when springs are compressed, which reduces the possible of reel jams.

49 Claims, 12 Drawing Sheets

(56) References Cited

U.S. PATENT DOCUMENTS

| | | | |
|---|---|---|---|
| 6,908,054 B1* | 6/2005 | Kim | .................... A01K 89/0155 188/18 A |
| 6,959,886 B1* | 11/2005 | Rho | .................... A01K 89/0155 188/181 A |
| 9,999,210 B1* | 6/2018 | Kim | ..................... A01K 89/033 |
| 2004/0050990 A1 | 3/2004 | Seo | |
| 2005/0178872 A1 | 8/2005 | Hyun | |
| 2006/0060687 A1* | 3/2006 | Lee | .................... A01K 89/0155 242/289 |
| 2006/0175449 A1* | 8/2006 | Hyun | ................. A01K 89/0155 242/286 |
| 2008/0257997 A1 | 10/2008 | Rho | |
| 2011/0073697 A1* | 3/2011 | Koh | ................. A01K 89/01555 242/288 |
| 2011/0079672 A1* | 4/2011 | Kim | ................. A01K 89/01557 242/289 |

\* cited by examiner

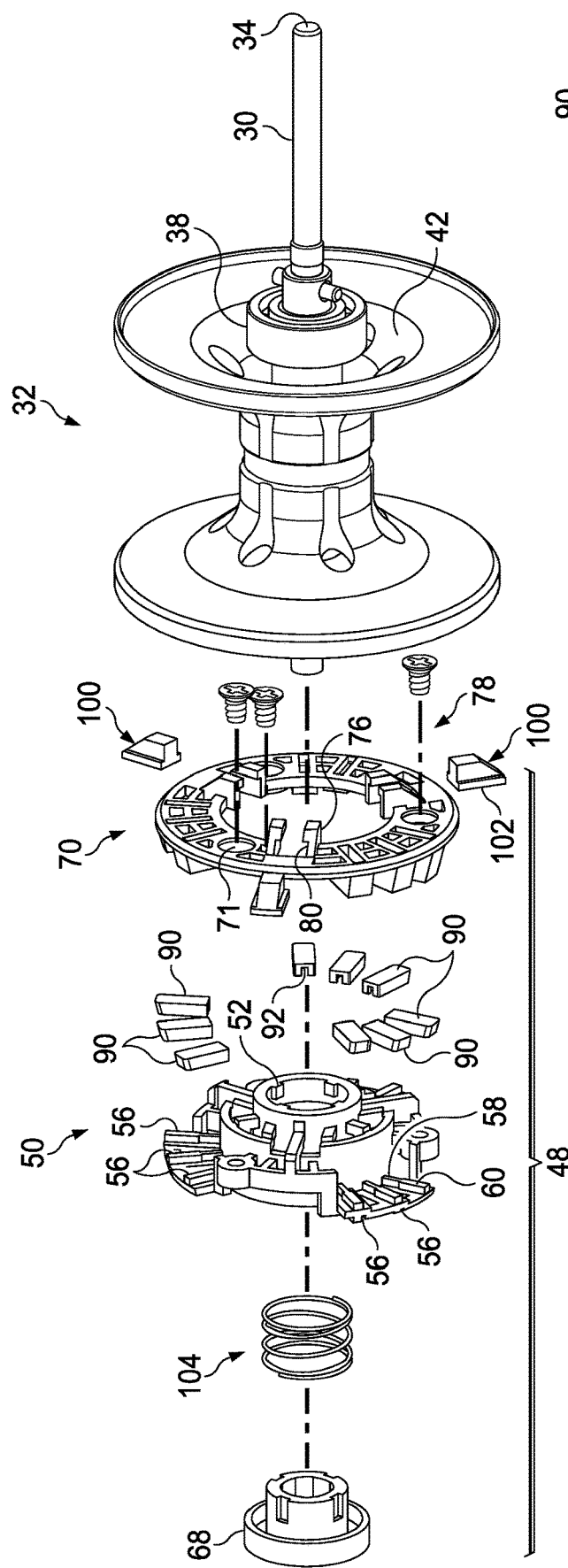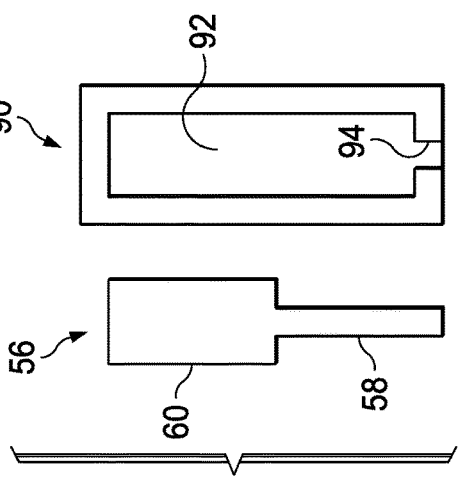
FIG. 2A
FIG. 2B

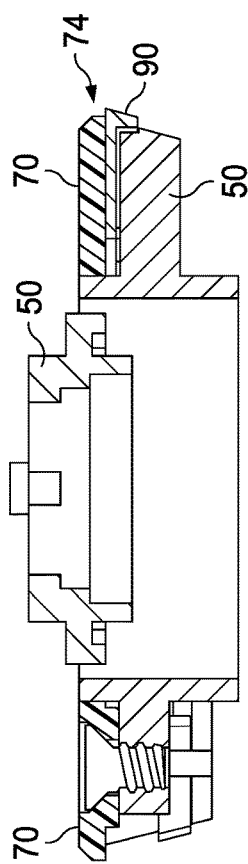
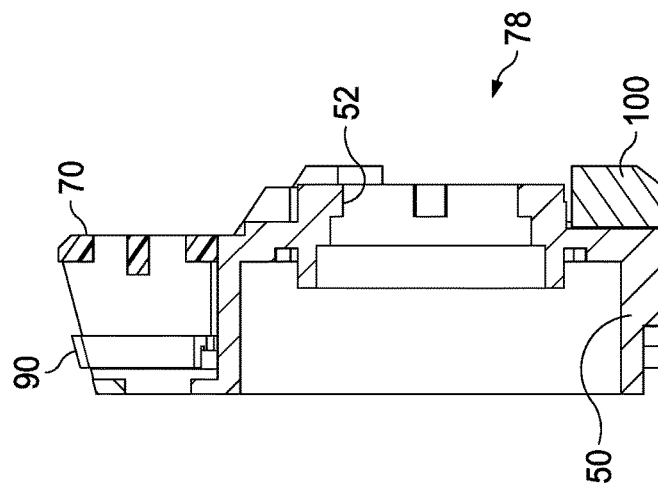
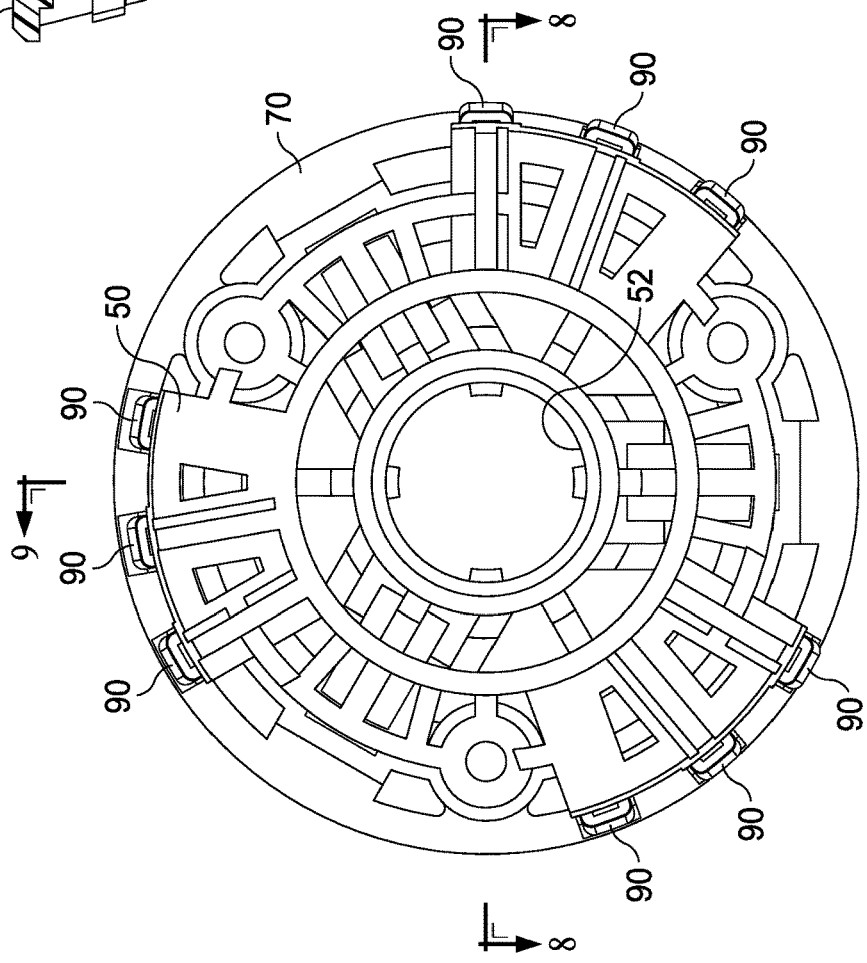

CENTRIFUGAL BRAKING SYSTEM FOR BAITCAST FISHING REELS

CROSS REFERENCE TO RELATED APPLICATIONS

This application claims the priority of U.S. Provisional Patent Application No. 62/531,163 entitled "CENTRIFUGAL BRAKING SYSTEM FOR BAITCAST FISHING REELS," filed Jul. 11, 2017, the contents of which are hereby incorporated by reference.

FIELD OF THE INVENTION

The present invention relates to centrifugal brake systems on fishing reels and, more particularly, to an automatic brake system wherein braking action on the spool is dependent upon the rotation speed of the spool in addition to an external adjustment brake system. Additionally, the centrifugal brake system of the invention provides improved brake retention structure and improved spring guides for preventing reel jamming.

BACKGROUND OF THE INVENTION

Centrifugal brake systems are commonly used on casting reels to prevent backlash. Backlash may frequently occur when the line-carrying spool is rotating at high velocities. Commonly, a brake mechanism is mounted on the spool for rotation therewith. The brake mechanism has an associated brake pad that is urged radially outwardly against a brake surface on the reel housing by centrifugal forces produced by the rotation of the spool.

However, centrifugal braking may have an adverse effect on casting distance. It is, therefore, desirable to provide a system wherein additional braking is provided at high spool spin velocities, but not at lower speed velocities, so as to maximize casting distance and to minimize backlash under conditions of long casting when brake control adjustments are set to "free".

SUMMARY OF THE INVENTION

A fishing reel of the invention has a spool assembly mounted on a spool shaft. A brake assembly is slidably mounted on the spool shaft. In one embodiment, the brake assembly is keyed to the spool assembly for ensuring that the brake assembly and the spool assembly rotate together. The brake assembly defines a plurality of brake shoe receptacles for receiving slidably retained brake shoes therein. In one embodiment, the brake shoes are mounted on a radially oriented rail located within the brake shoe receptacle. Brake shoes may define a channel for receiving the radially oriented rail so that brake shoe is slidably mounted on the rail. A brake ring is located proximate to the brake assembly so that the brake shoes can extend radially from the brake assembly to make braking contact when the brake assembly is rotated.

In one embodiment, the radially oriented rail defines a narrow section and a wide section that define a stop therebetween. The brake shoes define a channel having a narrowed area. The narrowed area within the brake shoe channel engages the stop for limiting radial travel of the brake shoe.

A plurality of speed adjust shoes may be slidably affixed to the brake assembly and positioned to make contact with a conical surface formed in an adjacent end of the spool assembly. The speed adjust shoes extend outwardly to make contact with the conical surface of the spool assembly when the brake assembly is spun with sufficient velocity. The speed adjust shoe thereby imparts an axial force to the brake assembly for moving the brake assembly towards the brake ring for positioning the brake shoes to make braking contact with the brake ring. The speed adjust shoes provide a lesser centrifugal force against the conical surface at relatively lower rotational speeds, which allows the speed adjust spring to push the brake assembly away from the brake ring. Consequently, the brake shoes are not in position to engage the brake ring at lower rotational speeds.

In one embodiment, a holder is located proximate a palm side end of the spool shaft. A speed adjust spring having a first end in contact with the holder and having a second end in contact with the brake assembly provides a biasing force for urging the brake assembly away from the brake ring and towards the spool assembly.

Braking force resulting from the brake shoes contacting the brake ring is adjustable by setting a brake control dial. The brake control dial moves the brake ring axially to position the brake shoes at a relatively smaller diameter or relatively larger diameter portion of the brake ring, thereby affecting how far the brake shoes must travel radially before contacting the brake ring. The brake control dial defines a camming surface that engages a plurality of cam follower tabs on the brake ring so that a position of the brake ring can be adjusted by the brake control dial. The cam follower tabs are biased against the camming surface by springs. A brake spring retainer is provided that has a base and a plurality of posts that extend from the base. Each of the springs surrounds one of the plurality of posts. Therefore, the springs are maintained in a parallel relationship by the posts when the springs are compressed, which reduces the possible of reel jams.

In one embodiment, the reel comprises a spool assembly mounted on a spool shaft, a brake assembly slidably mounted on the spool shaft, the brake assembly defining a radially oriented rail. A brake shoe defines a channel for receiving the radially oriented rail. The brake shoe is slidably mounted on the rail. A brake ring is proximate to the brake assembly. The brake shoe extends radially from the brake assembly when the brake assembly is rotated. In one embodiment, the rail defines a stop. In one embodiment, the brake shoe defines a narrowed area within the channel for engaging the stop for limiting radial travel of the brake shoe. In one embodiment, the rail defines a narrow section and a wide section, the wide section having a greater width than the narrowed area of the channel for limiting radial travel of the brake shoe. In one embodiment, the reel comprises a speed adjust shoe slidably affixed to the brake assembly, and a conical surface for selectively engaging the speed adjust shoe. The speed adjust shoe migrates outwardly in contact with the conical surface when the brake assembly is spun with sufficient velocity and the speed adjust shoe imparts an axial force to the brake assembly for moving the brake assembly towards the brake ring. In one embodiment, the conical surface is part of the spool assembly. In one embodiment, the reel further comprises a holder proximate a palm side end of the spool shaft, a speed adjust spring having a first end in contact with the holder and having a second end in contact with the brake assembly, the speed adjust spring for biasing the brake assembly away from the brake ring and towards the spool assembly. The speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring. In one embodiment, the reel further comprises a brake control dial. Braking force resulting from the brake shoe against the brake ring is adjustable by the brake control dial. In one embodiment, the brake control dial defines a camming surface, and the brake ring has a plurality of cam follower tabs for engaging the camming surface so that a position of the brake ring can be adjusted by the brake control dial. The cam follower tabs are biased against the camming surface by springs. In one embodiment, reel further comprises a brake spring retainer having a base and a plurality of posts that extend from the base. Each of the springs surrounds one of the plurality of posts, wherein the springs are maintained in a parallel relationship by the posts when the springs are compressed. In one embodiment, the brake assembly is keyed to the spool assembly for ensuring that the brake assembly and the spool assembly rotate together. In one embodiment, the reel further comprises a retaining post extending from the spool assembly, and a post receiving orifice defined by the brake assembly for receiving the retaining post. Engagement of the retaining post and the post receiving orifice keys the brake assembly to the spool assembly. Aspects of the invention may include each of the above listed components or selected components from the above listed components singularly or in combination.

For example, the invention may comprise a brake shoe defining a channel for receiving the radially oriented rail, wherein the brake shoe is slidably mounted on the rail. One embodiment may include a brake ring is proximate to the brake assembly. The brake shoe extends radially from the brake assembly when the brake assembly is rotated. In one embodiment, the rail defines a stop. In one embodiment, the brake shoe defines a narrowed area within the channel for engaging the stop for limiting radial travel of the brake shoe. In one embodiment, the rail defines a narrow section and a wide section, the wide section having a greater width than the narrowed area of the channel for limiting radial travel of the brake shoe.

As another example, the invention may comprise a speed adjust shoe slidably affixed to the brake assembly for selectively engaging a conical surface. The speed adjust shoe migrates outwardly in contact with the conical surface when the brake assembly is spun with sufficient velocity and the speed adjust shoe imparts an axial force to the brake assembly for moving the brake assembly towards the brake ring. In one embodiment, the conical surface is part of the spool assembly.

In one embodiment, the reel includes a spool assembly mounted on a spool shaft, a brake assembly slidably mounted on the spool shaft, a brake shoe and a speed adjust shoe slidably retained in the brake assembly, a brake ring proximate to the brake assembly, and a conical surface proximate to the brake assembly. The brake shoe may extend radially from the brake assembly when the brake assembly is rotated. A holder is proximate a palm side end of the spool shaft. A speed adjust spring having a first end in contact with the holder and having a second end in contact with the brake assembly, the speed adjust spring for biasing the brake assembly away from the brake ring and towards the spool assembly. The speed adjust shoe may be sized so that the speed adjust shoe applies a centrifugal force against the conical surface when the brake assembly is rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring. In one embodiment, the brake assembly defines a radially oriented rail, the brake shoe defines a channel for receiving the radially oriented rail and the brake shoe is slidably mounted on the rail. In another embodiment, the rail defines a stop, and the brake shoe defines a narrowed area within the channel for engaging the stop for limiting radial travel of the brake shoe. In another embodiment, the rail defines a narrow section and a wide section, the wide section has a greater width than the narrowed area of the channel for limiting radial travel of the brake shoe. In another embodiment, the speed adjust shoe migrates outwardly in contact with the conical surface when the brake assembly is spun with sufficient velocity and the speed adjust shoe imparts an axial force to the brake assembly for moving the brake assembly towards the brake ring. In another embodiment, the conical surface is part of the spool assembly. In another embodiment, the reel includes a brake control dial, and braking force resulting from the brake shoe against the brake ring is adjustable by the brake control dial. In another embodiment, the brake control dial defines a camming surface, the brake ring has a plurality of cam follower tabs for engaging the camming surface so that a position of the brake ring can be adjusted by the brake control dial and the cam follower tabs are biased against the camming surface by springs. In another embodiment, the reel includes a brake spring retainer having a base and a plurality of posts that extend from the base and each of the springs surrounds one of the plurality of posts. The springs are maintained in a parallel relationship by the posts when the springs are compressed. In another embodiment, the brake assembly is keyed to the spool assembly for ensuring that the brake assembly and the spool assembly rotate together. In another embodiment, the reel includes a retaining post extending from the spool assembly, and a post receiving orifice defined by the brake assembly for receiving the retaining post. The engagement of the retaining post and the post receiving orifice keys the brake assembly to the spool assembly. Aspects of the invention may include each of the above listed components or selected components from the above listed components singularly or in combination.

For example, the invention may comprise a brake shoe that extends radially from the brake assembly when the brake assembly is rotated. A holder is proximate a palm side end of the spool shaft, a speed adjust spring having a first end in contact with the holder and having a second end in contact with the brake assembly, the speed adjust spring for biasing the brake assembly away from the brake ring and towards the spool assembly. In one embodiment, the brake assembly defines a radially oriented rail, and the brake shoe defines a channel for receiving the radially oriented rail and the brake shoe is slidably mounted on the rail. In another embodiment, the rail defines a stop, and the brake shoe defines a narrowed area within the channel for engaging the stop for limiting radial travel of the brake shoe. In another embodiment, the rail defines a narrow section and a wide section, the wide section has a greater width than the narrowed area of the channel for limiting radial travel of the brake shoe.

As another example, the invention may comprise a speed adjust shoe that applies a centrifugal force against a conical surface when the brake assembly is rotated, thereby causing the brake assembly to move towards the brake ring. The speed adjust shoe provides a lesser centrifugal force against the conical surface at relatively lower rotational speeds thereby causing the speed adjust spring to push the brake assembly away from the brake ring.

As a further example, the invention may comprise a brake spring retainer having a base and a plurality of posts that extend from the base and each of the springs surrounds one of the plurality of posts. The springs are maintained in a parallel relationship by the posts when the springs are compressed. In another embodiment, the brake assembly is keyed to a spool assembly for ensuring that the brake assembly and the spool assembly rotate together. In another embodiment, retaining posts extend from a spool assembly, and a post receiving orifice defined by the brake assembly for receiving the retaining post. The engagement of the retaining post and the post receiving orifice keys the brake assembly to the spool assembly In one embodiment, the reel includes a spool assembly mounted on a spool shaft, and a brake assembly slidably mounted on the spool shaft. The brake assembly is keyed to the spool assembly for ensuring that the brake assembly and the spool assembly rotate together. The reel further includes a brake shoe slidably received in the brake assembly, a brake ring proximate to the brake assembly. The brake shoe extends radially from the brake assembly when the brake assembly is rotated for engaging the brake ring. In one embodiment, the brake assembly defines a radially oriented rail, and the brake shoe defines a channel for receiving the radially oriented rail. The brake shoe is slidably mounted on the rail. In another embodiment, the rail defines a stop, and the brake shoe defines a narrowed area within the channel for engaging the stop for limiting radial travel of the brake shoe. In another embodiment, the rail defines a narrow section and a wide section, and the wide section has a greater width than the narrowed area of the channel for limiting radial travel of the brake shoe. In another embodiment, the reel includes a speed adjust shoe slidably retained by the brake assembly, and a conical surface for selectively engaging the speed adjust shoe. The speed adjust shoe migrates outwardly for contacting the conical surface when the brake assembly is spun with sufficient velocity and the speed adjust shoe imparts an axial force to the brake assembly for moving the brake assembly towards the brake ring. In another embodiment, the conical surface is part of the spool assembly. In another embodiment, a holder is proximate a palm side end of the spool shaft, a speed adjust spring having a first end in contact with the holder and having a second end in contact with the brake assembly, and the speed adjust spring for biasing the brake assembly away from the brake ring and towards the spool assembly. In another embodiment, a speed adjust shoe is slidably retained in the brake assembly. The speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring. In another embodiment, braking force resulting from the brake shoe against the brake ring is adjustable by the brake control dial. In another embodiment, the brake control dial defines a camming surface, and the brake ring has a plurality of cam follower tabs for engaging the camming surface so that a position of the brake ring can be adjusted by the brake control dial. The cam follower tabs are biased against the camming surface by springs. In another embodiment, a brake spring retainer has a base and a plurality of posts that extend the base. Each of the springs surrounds one of the plurality of posts. The springs are maintained in a parallel relationship by the posts when the springs are compressed. In another embodiment, the brake assembly is keyed to the spool assembly for ensuring that the brake assembly and the spool assembly rotate together. In another embodiment, a retaining post extends from the spool assembly, and a post receiving orifice is defined by the brake assembly for receiving the retaining post. The engagement of the retaining post and the post receiving orifice keys the brake assembly to the spool assembly. Aspects of the invention may include each of the above listed components or selected components from the above listed components in singularly or in combination.

For example, the invention may comprise a brake assembly. The brake assembly may be keyed to the spool assembly for ensuring that the brake assembly and the spool assembly rotate together. A brake shoe is slidably received in the brake assembly. A brake ring may be provided proximate to the brake assembly. The brake shoe extends radially from the brake assembly when the brake assembly is rotated for engaging the brake ring. In one embodiment, the brake assembly defines a radially oriented rail, and the brake shoe defines a channel for receiving the radially oriented rail. The brake shoe is slidably mounted on the rail. In another embodiment, the rail defines a stop, and the brake shoe defines a narrowed area within the channel for engaging the stop for limiting radial travel of the brake shoe. In another embodiment, the rail defines a narrow section and a wide section, and the wide section has a greater width than the narrowed area of the channel for limiting radial travel of the brake shoe.

As a further example, a brake assembly slidably retains a speed adjust shoe. A conical surface is provided for selectively engaging the speed adjust shoe. The speed adjust shoe migrates outwardly for contacting the conical surface when the brake assembly is spun with sufficient velocity and the speed adjust shoe imparts an axial force to the brake assembly for moving the brake assembly towards the brake ring. In another embodiment, the conical surface is part of the spool assembly. In another embodiment, a holder is proximate a palm side end of the spool shaft, a speed adjust spring having a first end in contact with the holder and having a second end in contact with the brake assembly, and the speed adjust spring for biasing the brake assembly away from the brake ring and towards the spool assembly. In another embodiment, a speed adjust shoe is slidably retained in the brake assembly. The speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring.

In a further example, a spool assembly defines a retaining post that extends outwardly. A post receiving orifice is defined by the brake assembly for receiving the retaining post. The engagement of the retaining post and the post receiving orifice keys the brake assembly to the spool assembly.

In another embodiment, a reel comprises a spool assembly mounted on a spool shaft, a brake assembly slidably mounted on the spool shaft, a brake shoe slidably retained in the brake assembly wherein the brake shoe is radially extendible from the brake assembly when the brake assembly is rotated, a brake ring proximate to the brake assembly, the brake ring defining a cam follower, and a brake control dial defining a camming surface for engaging the cam follower of the brake ring, the brake control dial for axially adjusting a position of the brake ring for controlling a braking force resulting from the brake shoe against the brake ring. The cam follower is biased against the camming surface by springs, and a brake spring retainer having a base and a plurality of posts that extend from the base and wherein each of the springs surrounds one of the plurality of posts. The springs are maintained in a parallel relationship by the posts when the springs are compressed. In one embodiment, the brake assembly defines a radially oriented rail, and the brake shoe defines a channel for receiving the radially oriented rail. The brake shoe is slidably mounted on the rail. In one embodiment, the rail defines a stop, and the brake shoe defines a narrowed area within the channel for engaging the stop for limiting radial travel of the brake shoe. In one embodiment, the rail defines a narrow section and a wide section, the wide section has a greater width than the narrowed area of the channel for limiting radial travel of the brake shoe. In one embodiment, a speed adjust shoe is slidably affixed to the brake assembly, and conical surface is provided for selectively engaging the speed adjust shoe. The speed adjust shoe migrates outwardly in contact with the conical surface when the brake assembly is spun with sufficient velocity and the speed adjust shoe imparts an axial force to the brake assembly for moving the brake assembly towards the brake ring. In one embodiment, the conical surface is part of the spool assembly. In one embodiment, a holder is proximate a palm side end of the spool shaft, a speed adjust spring having a first end in contact with the holder and having a second end in contact with the brake assembly, and the speed adjust spring for biasing the brake assembly away from the brake ring and towards the spool assembly. The speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring. In one embodiment, the brake assembly is keyed to the spool assembly for ensuring that the brake assembly and the spool assembly rotate together. In one embodiment, the reel includes a retaining post extending from the spool assembly, and a post receiving orifice defined by the brake assembly for receiving the retaining post. Engagement of the retaining post and the post receiving orifice keys the brake assembly to the spool assembly. Aspects of the invention may include each of the above listed components or selected components from the above listed components in singularly or in combination.

For example, the invention may comprise a brake assembly. The brake assembly may be slidably mounted on a spool shaft. A brake shoe may be slidably retained in the brake assembly. The brake shoe is radially extendible from the brake assembly when the brake assembly is rotated, a brake ring proximate to the brake assembly, the brake ring defining a cam follower, and a brake control dial defining a camming surface for engaging the cam follower of the brake ring, the brake control dial for axially adjusting a position of the brake ring for controlling a braking force resulting from the brake shoe against the brake ring. In one embodiment, the brake assembly defines a radially oriented rail, and the brake shoe defines a channel for receiving the radially oriented rail. The brake shoe is slidably mounted on the rail. In one embodiment, the rail defines a stop, and the brake shoe defines a narrowed area within the channel for engaging the stop for limiting radial travel of the brake shoe. In one embodiment, the rail defines a narrow section and a wide section, the wide section has a greater width than the narrowed area of the channel for limiting radial travel of the brake shoe.

In another example, the invention comprises a brake spring retainer having a base and a plurality of posts that extend from the base. Each of a plurality of springs surround one of the plurality of posts. The springs are maintained in a parallel relationship by the posts when the springs are compressed.

In another example, the invention comprises a brake assembly. A speed adjust shoe is slidably affixed to the brake assembly. A conical surface is provided for selectively engaging the speed adjust shoe. The speed adjust shoe migrates outwardly in contact with the conical surface when the brake assembly is spun with sufficient velocity and the speed adjust shoe imparts an axial force to the brake assembly for moving the brake assembly towards the brake ring. In one embodiment, the conical surface is part of the spool assembly. In one embodiment, a holder is proximate a palm side end of the spool shaft, a speed adjust spring having a first end in contact with the holder and having a second end in contact with the brake assembly, and the speed adjust spring for biasing the brake assembly away from the brake ring and towards the spool assembly. The speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring.

BRIEF DESCRIPTION OF THE DRAWINGS

FIG. 2A is an exploded view of the spool and brake assembly of the reel of FIG. 1;

FIG. 2B is an enlarged view of a brake shoe and brake shoe rail shown in FIG. 2A;

FIG. 7 is a plan view of the brake assembly of the reel of FIG. 1;

FIG. 8 is a cross-sectional elevation view of the brake assembly of the reel of FIG. 1 taken along line 8-8 of FIG. 7;

FIG. 9 is a cross-sectional elevation view of the brake assembly of the reel of FIG. 1 taken along line 9-9 of FIG. 7;

DETAILED DESCRIPTION OF THE PREFERRED EMBODIMENTS

Figure 1:
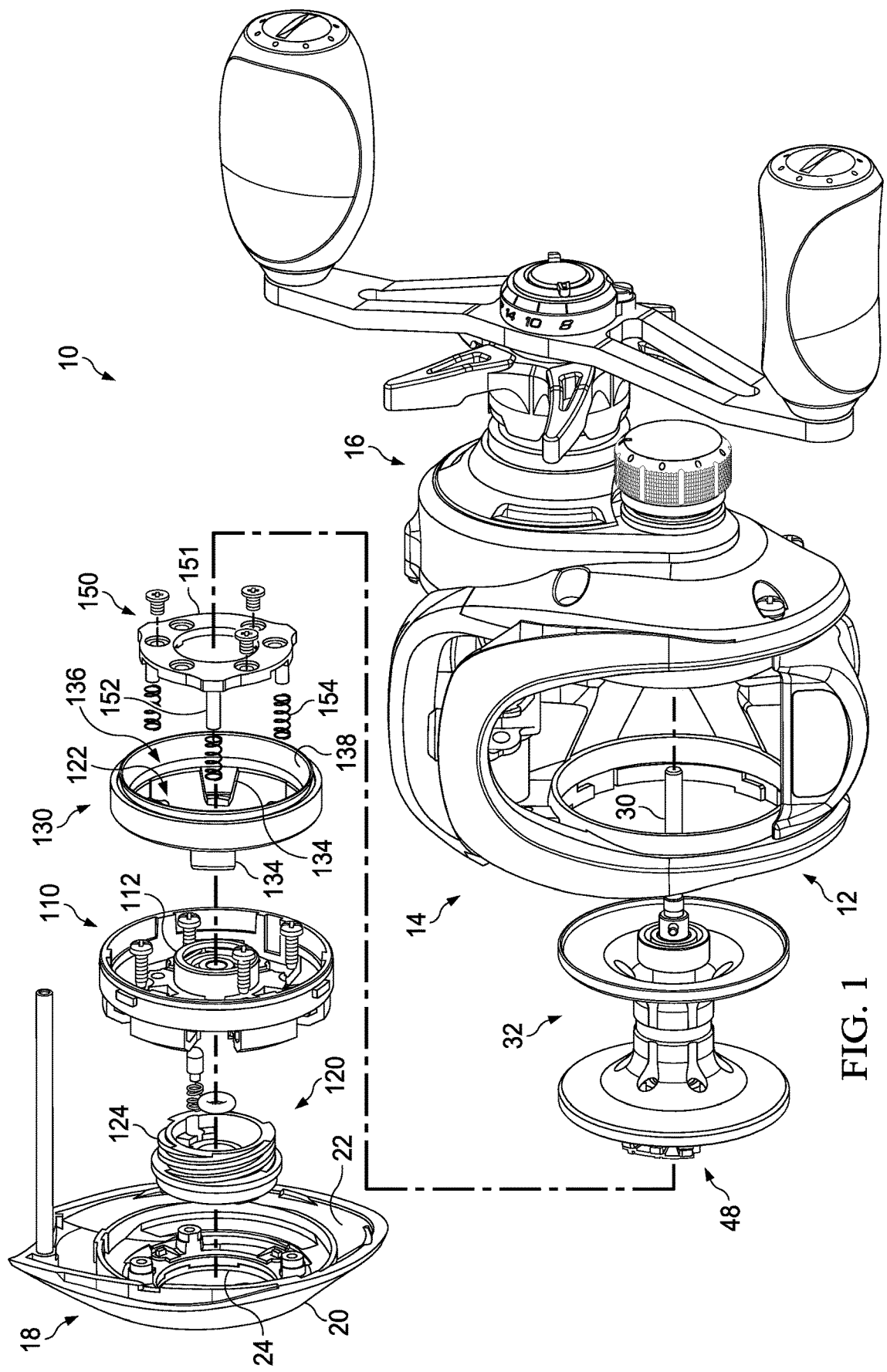
FIG. 1 is a partially exploded perspective view of the reel of the invention.

Shown in FIGS. 1-9 is a reel designated generally 10. Reel 10 includes frame 12 having palm side 14 and gear side 16. Palm side cover assembly 18 has outside surface 20 and inside surface 22. Inside surface 22 of palm side cover assembly 18 is affixed to palm side 14 of frame 12. Palm side cover assembly 18 defines dial orifice 24.

Spool shaft 30 supports spool assembly 32 (FIG. 2). Spool shaft 30 has a gear end 34 and a palm end 36 (FIGS. 3, 6, 10, 12, 13). Gear side spool shaft bearing 38 (FIGS. 2, 6) is mounted in gear side 16 of frame 12 for supporting gear end 34 of spool shaft 30.

Palm side spool shaft bearing 40 (FIGS. 10-13) supports palm end 36 of spool shaft 30. Palm side bearing 40 is received within central member 112 of brake spool cover 110, discussed below.

Spool assembly 32 is mounted on spool shaft 30. Spool assembly 32 defines gear side conical surface 42 (FIGS. 1, 2, 6) and defines palm side conical surface 44. Retaining posts 46 (FIG. 3) protrude from the palm side of spool assembly 32.

Referring now primarily to FIGS. 2, 3, and 6-9, shown is a brake assembly 48. Brake assembly 48 refers to the combination of brake shoe retainer 50, brake shoe holder 70, brake shoes 90, and speed adjust shoes 100. Brake shoe retainer 50 defines central protuberance 52. Brake shoe retainer 50 defines gear side 54. Central protuberance 52 defines an orifice for receiving spool shaft 30.

Brake shoe retainer 50 and brake shoe holder 70 define a plurality of brake shoe receptacles 74 therebetween. A plurality of speed adjust shoe retainers 76 are defined by gear side 78 of brake shoe holder 70. Brake shoe retainer 50 defines a plurality of brake shoe rails 56 that are located within brake shoe receptacles 74. Brake shoe rail 56 defines a narrow section 58 and a wide section 60 that has a relatively greater width than the narrow section. An intersection of the narrow section 58 and the wide section 60 define a stepped area or stop 62 therebetween. Holder 68 is received on spool shaft 30 adjacent to palm end 36 and engages central portion 52 of brake shoe retainer 50.

Brake shoe holder 70 defines post receiving orifices 71 for receiving retaining posts 46 of spool assembly 32. Engaging retaining posts 46 and post receiving orifices 71 ensures that spool assembly 32 and brake shoe holder 70, as well as the brake assembly, rotate together. By keying the brake shoe holder 70 to the spool assembly 32, brake shoe holder 70 need not be keyed to spool shaft 30. Brake shoe holder 70 may, therefore, be constructed with less material. Gear side 78 of brake shoe holder 70 defines one or more speed shoe retainers 76. Speed shoe retainers 76 preferably define T-shaped recess areas for receiving a complementary shaped speed shoe 100. T-shaped recess are includes retaining receiver 80 (FIG. 2). Brake shoe holder 70 is affixed to gear side 54 of brake shoe retainer 50 and surrounds spool shaft 38. Brake shoe holder 70 has a central orifice 72 for receiving central protuberance 52 of brake shoe retainer 50.

As best seen on FIG. 2B, brake shoe 90 defines a channel 92 for slidably receiving brake shoe rail 56. Channel 92 preferably defines narrowed area 94. Narrowed area 94 of channel 92 has a smaller width than the wide section 60. Narrowed area 94, therefore, functions as a slide stop against stop 62 for retaining brake shoe 90 on brake shoe rail 56. By providing rail guided brake shoes, i.e., by slidably locating brake shoes 90 on brake shoe rails 56 within brake shoe receptacle 74, play of brake shoe 90 is reduced, thereby reducing noise and facilitating quiet operation.

Brake shoes 90 are, therefore, slidably retained within each of a plurality of brake shoe receptacles 74. Brake shoes 90 are free to slide in a radial direction. Movement of brake shoes 90 is restricted in an axial or thrust direction.

Speed adjust shoe 100 is retained within each of the plurality of speed adjust shoe retainers 76. Speed adjust shoes 100 have a T-shaped cross-section that includes a retaining portion 102 that is slidably received in retaining receiver 80 of speed shoe retainer 76.

Speed adjust spring 104 engages holder 68 on a palm side end and engages brake shoe retainer 50 at a gear side end. Speed adjust spring 104 is provided for biasing brake shoe retainer 50 towards gear side 16 of frame 12 so that speed adjust shoe 100 is pressed into a fully retracted position within speed shoe retainer 76 by palm side conical exterior surface 44 of spool assembly 32.

Brake spool cover 110 (FIG. 1) is affixed to inside surface 22 of palm side cover assembly 18. Brake spool cover 110 has a central member 112 supported by a plurality of legs.

Brake control dial 120 is accessible through dial orifice 24 of palm side cover assembly 18. The gear side of brake control dial 120 defines cam surface 124.

Still referring to FIG. 1, brake ring support 130 has a central orifice 122 that receives central member 112 of brake spool cover 110. Brake ring support 130 defines cam follower tabs 134. Cam follower tabs 134 pass between legs of brake spool cover 110 to make contact with cam surface 124 for moving brake spool cover 110 in an axial direction, depending upon the rotation of brake control dial 120, discussed below.

Figure 10:
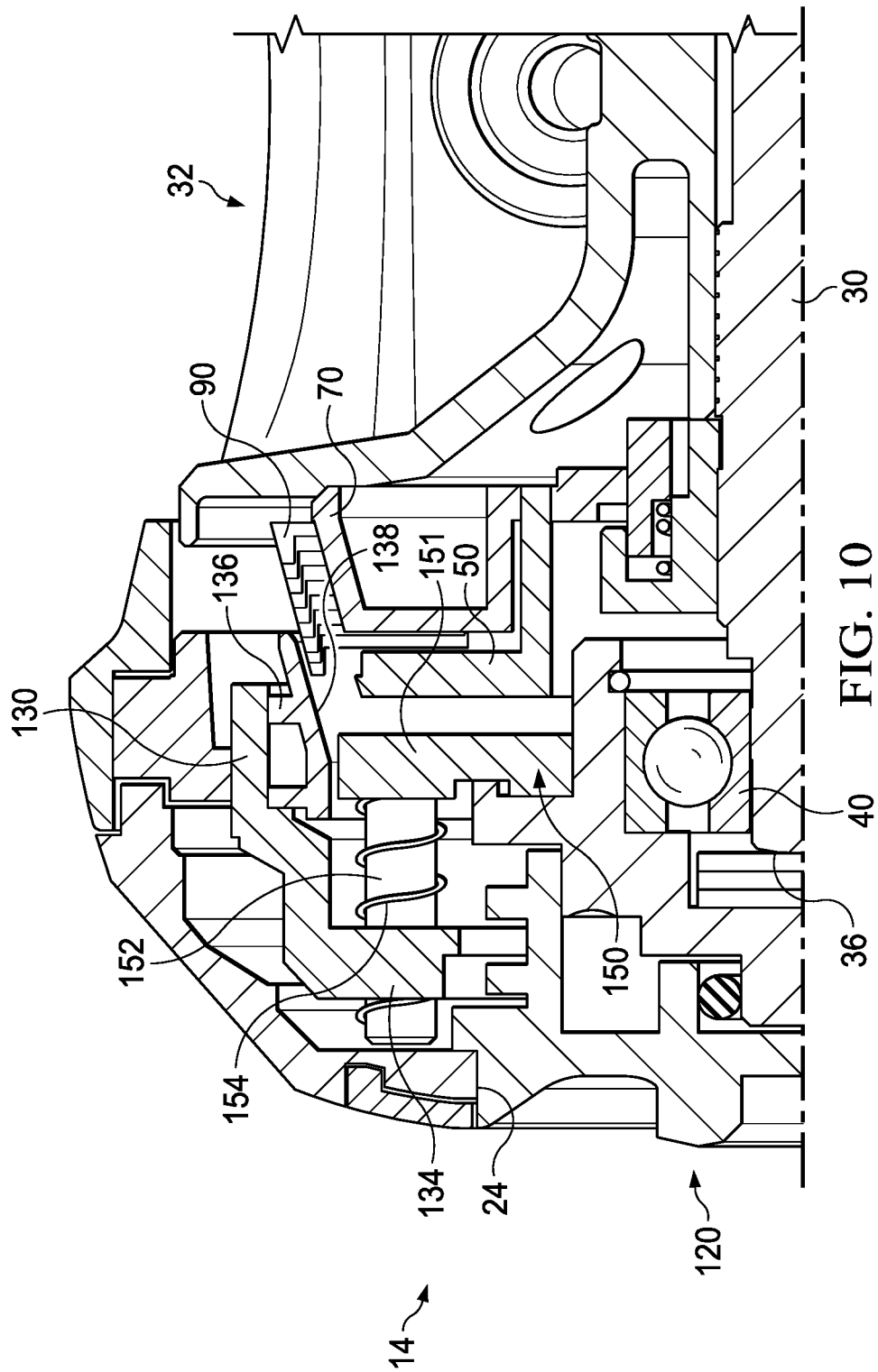
FIG. 10 is a cross-sectional elevation view of the reel of FIG. 1 showing a position of the brake shoe when the reel is experiencing low-speed casting.
Figure 11:
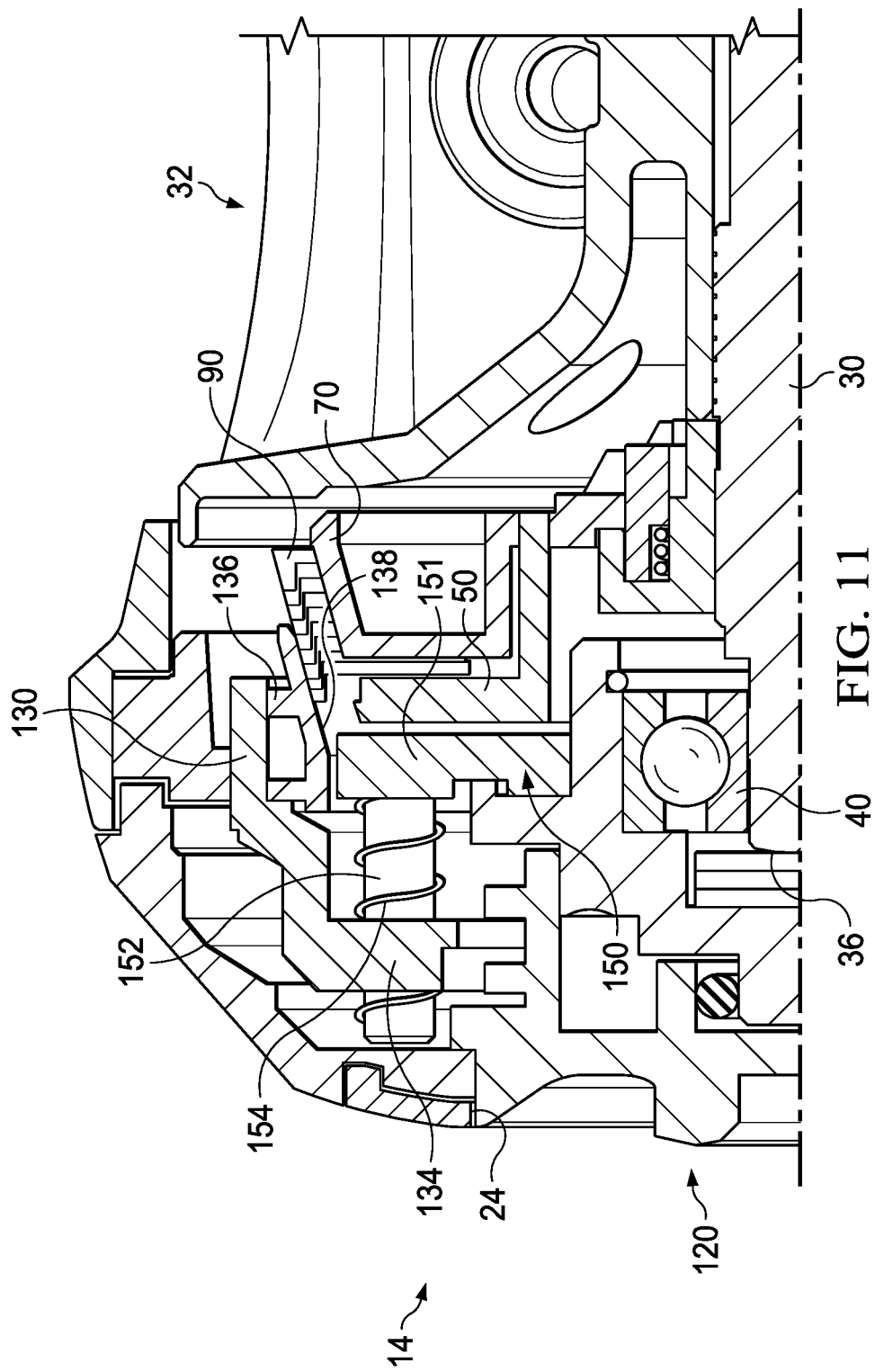
FIG. 11 is a cross-sectional elevation view of the reel of FIG. 1 showing a position of the brake shoe when the reel is experiencing high-speed casting.

Continuing with reference to FIG. 1, brake ring 136 is located within a brake receiving area of brake ring support 130. Brake ring 136 has a sloped brake shoe engaging surface 138 (see FIGS. 1, 10-13). Because of sloped brake shoe engaging surface 138, brake ring 136 has a smaller inside diameter at a palm side edge and a larger inside diameter at a gear side edge. Therefore, when brake assembly 48 is moved axially towards palm side 14 of reel 10, brake shoes 90 contact sloped brake shoe engaging surface 138 after travelling a shorter radial distance as compared to when brake assembly 48 has been axially displaced a lesser distance. This can be seen by referring to low speed casting state represented by FIG. 10, which shows no contact between brake shoe 90 and brake shoe engaging surface 138 or contact at large extension of brake shoe 90. In contrast, a high speed casting state, represented by FIG. 11 shows brake shoes 90 contacting a smaller diameter portion of brake ring 136, i.e., making contact with brake shoe engaging surface 138 closer to palm side 14 of reel 10.

Brake ring spring retainer 150 (FIGS. 4, 10, 11) is adjacent to a gear side of brake spool cover 110. Brake spring retainer 150 has a base 151 and a plurality of posts 152 that extend from base 151 toward palm side 14 of reel 10.

Brake control dial 120 defines cam surface 124 on gear side 122. Cam surface 124 is received within a space defined in part by a palm side surface of central member 112 of brake spool cover 110 and in part by legs of brake spool cover 110 to make contact with cam follower tabs 134 of brake ring support 130, which passes therethrough.

As best seen in FIG. 1, a plurality of brake frame assembly springs 154 are located on posts 152 of brake ring slider spring retainer 150 and bias cam follower tabs 134 of brake ring support 130 into contact with cam surface 124 of brake control dial 120. Locating brake frame assembly springs 154 on posts 152 facilitates maintaining springs 154 in a parallel relationship one another during compression, which eliminates reel jamming that may otherwise result.

By rotating brake control dial 120, a location of brake ring support 130 can be set to a desired position depending on the orientation of cam surfaces 124 of brake control dial 120. Cam follower tabs 134 of brake ring support 130 are biased against cam surfaces 124 by springs 154. The result is that the position of brake ring 136 is adjustable with respect to brake shoe retainer 50.

Figure 3:
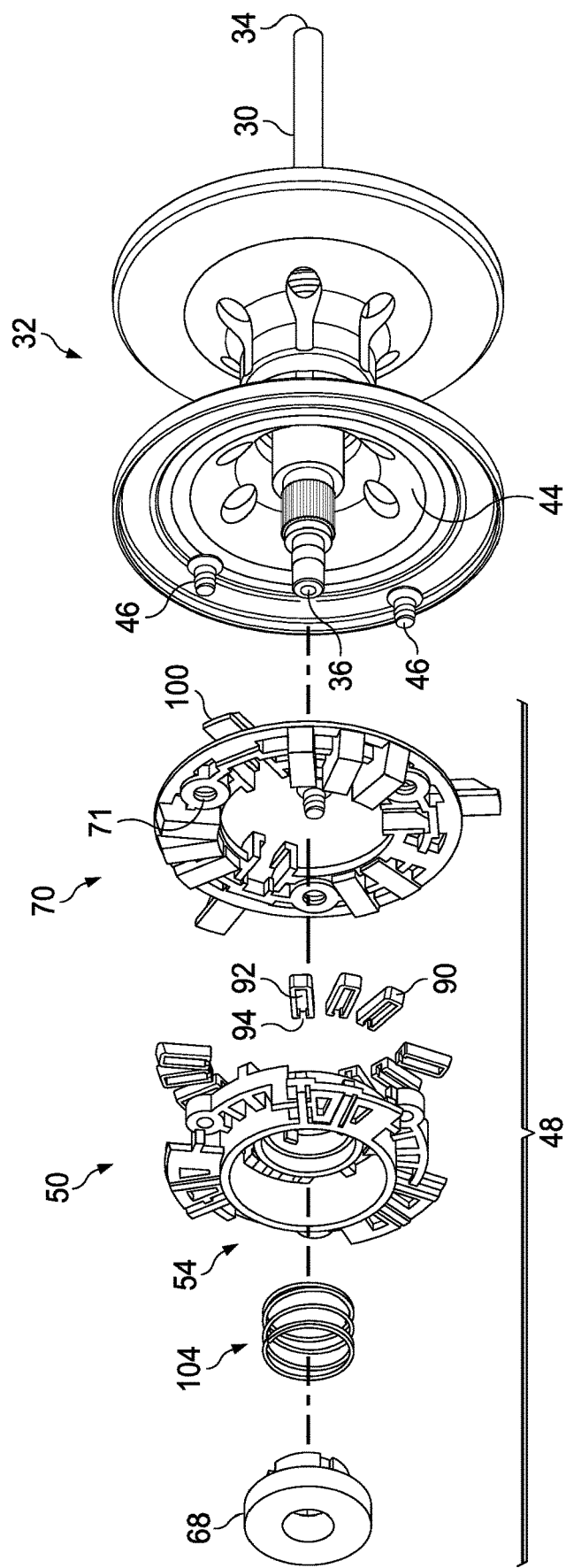
FIG. 3 is another exploded view of the spool and brake assembly of the reel of FIG. 1.
Figure 4:
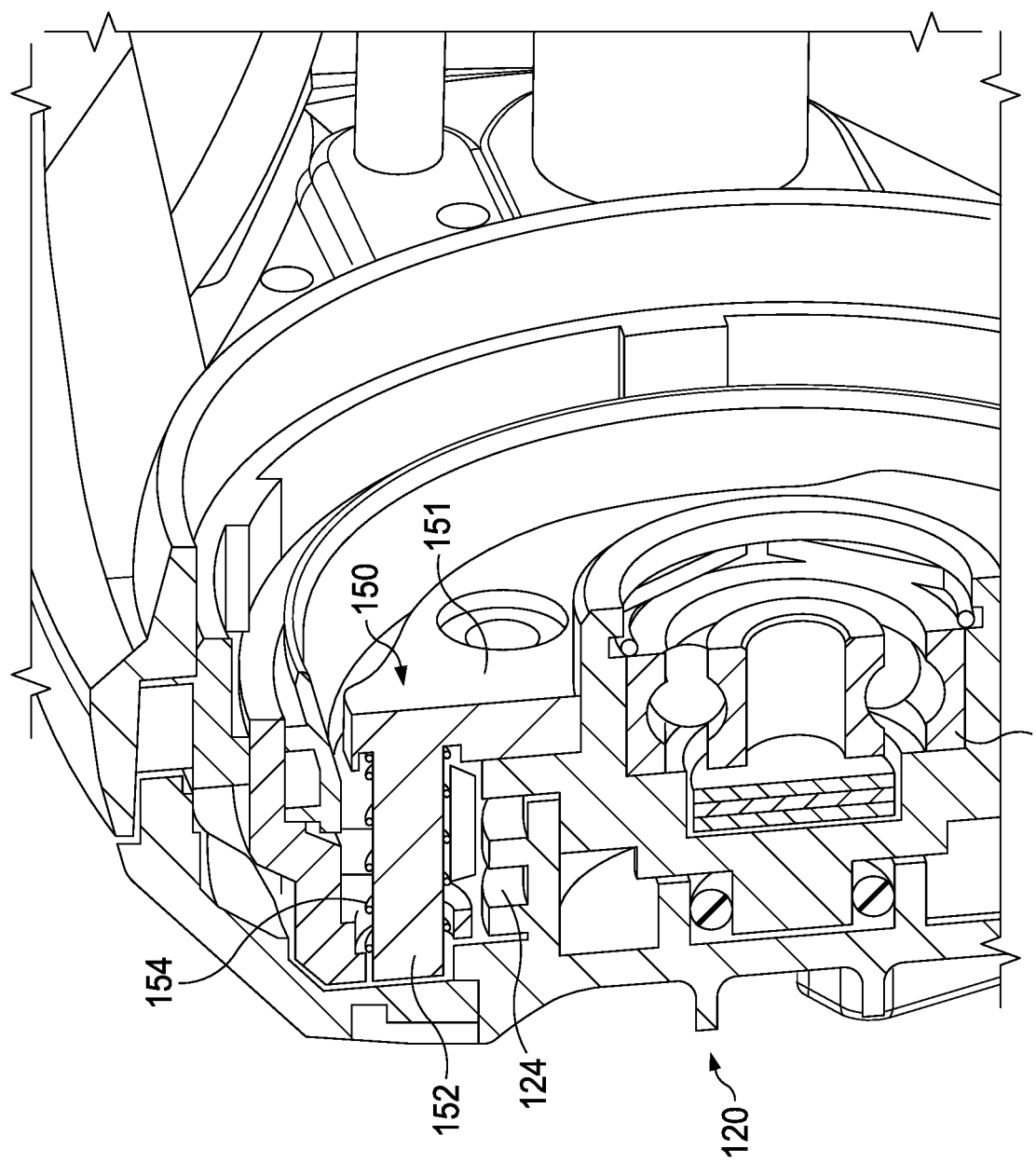
FIG. 4 is a partial cut-away view showing the brake spring retainer of the reel of FIG. 1.
Figure 5:
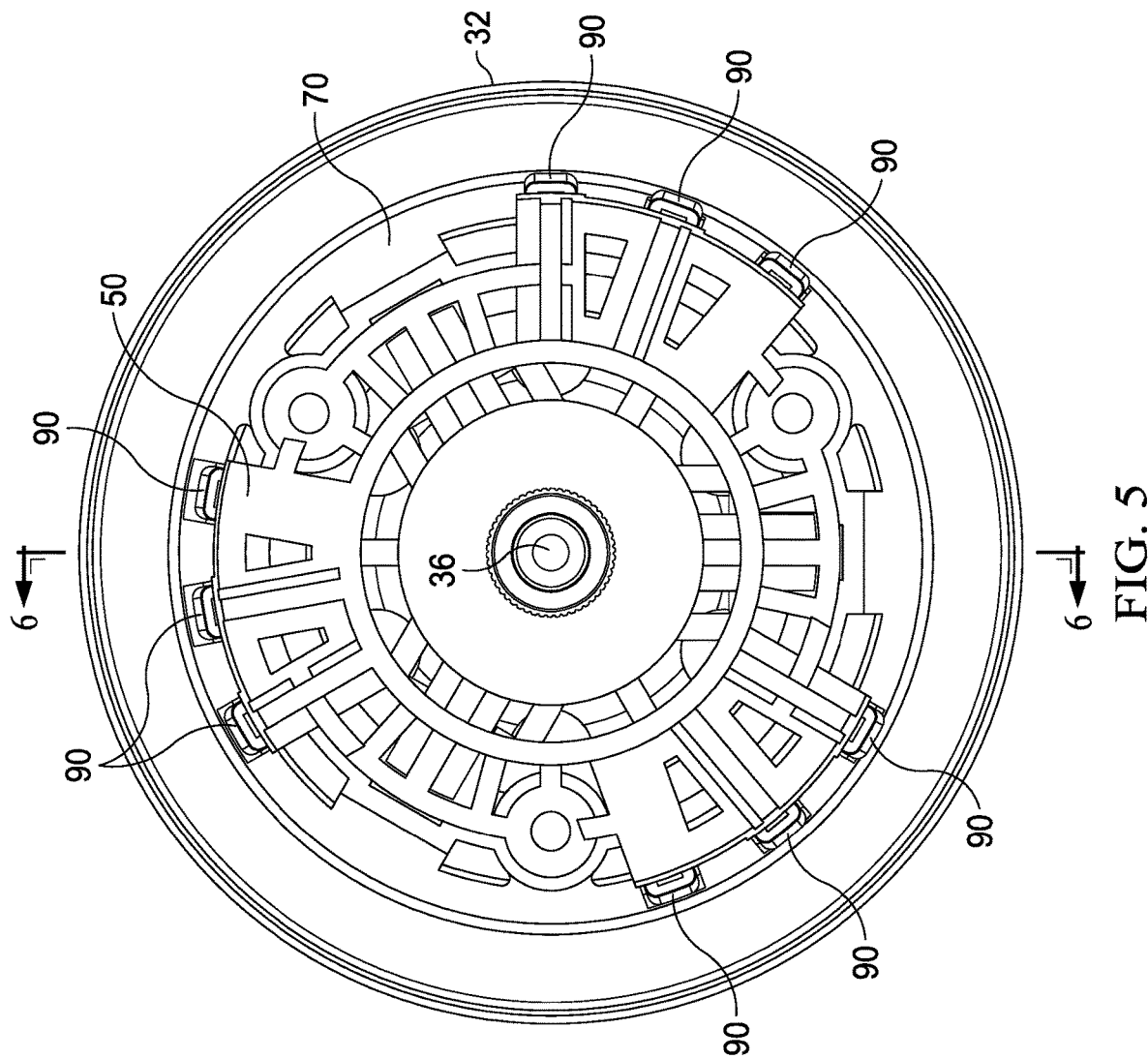
FIG. 5 is a an end view of the spool assembly of the reel of FIG. 1.
Figure 6:
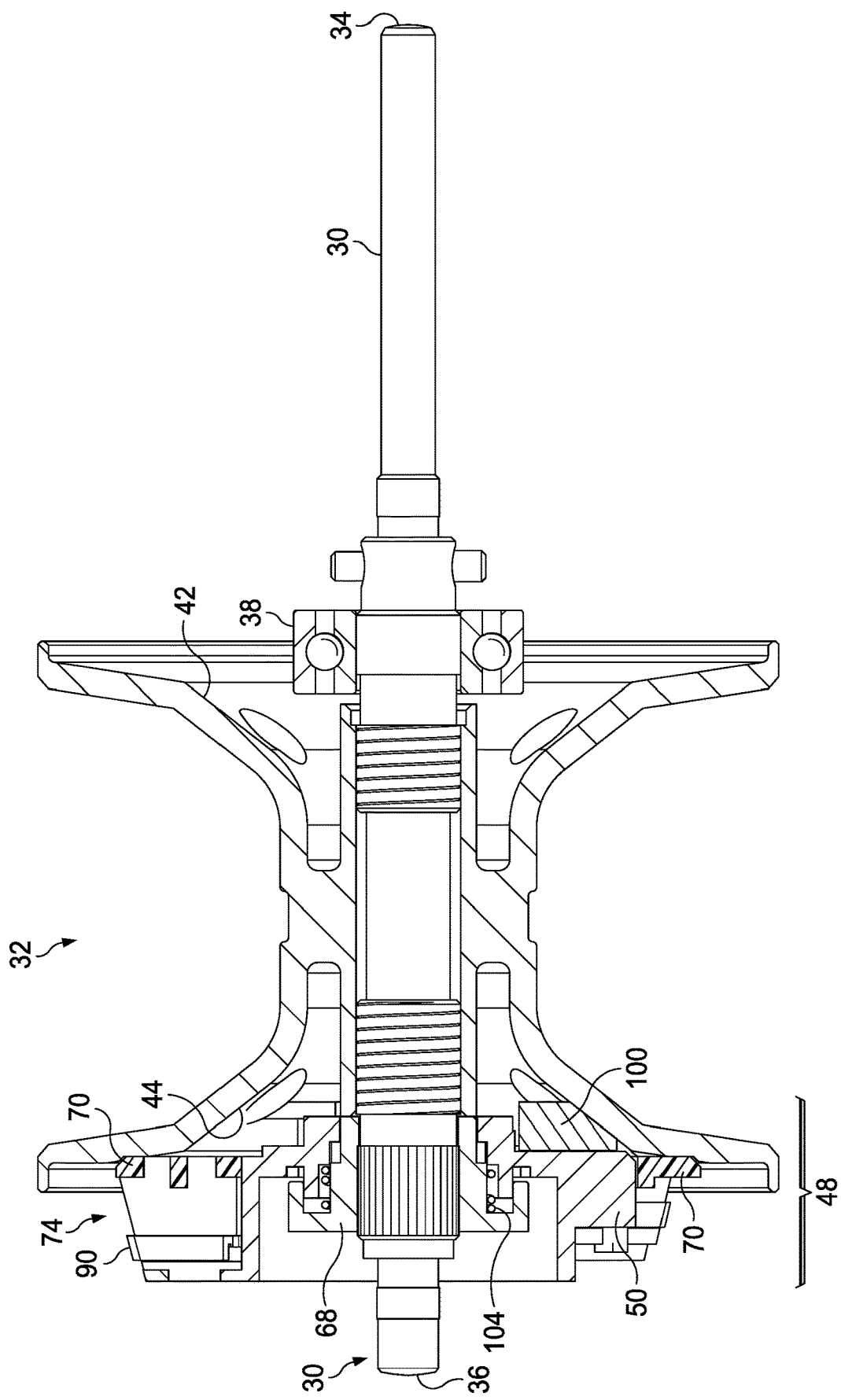
FIG. 6 is a cross-sectional elevation view of the spool assembly of the reel of FIG. 1 taken along line 6-6 of FIG. 5.

Brake shoe assembly 48, including brake shoe retainer 50 and brake shoe holder 70, is free to slide in an axial or thrust direction along spool shaft 30. Brake shoe retainer 50 is biased towards gear side 16 of reel 10, i.e., toward spool assembly 32, by speed adjust spring 104 (FIGS. 2, 3). Therefore, brake shoe retainer 50 can slide forward, i.e., toward palm side 14 of reel 10, when a thrust force from speed adjust shoes 100 is greater than the spring force from speed adjust spring 104. When rotation speed of spool assembly 32 slows and the axial thrust force generated by speed adjust shoes 100 diminishes, brake shoe retainer 50 then moves in a gear side direction, i.e. returns to its original position due to the spring force from speed adjust spring 104. Auto adjusting speed adjust shoes 100 slide within speed adjust shoe retainers 76, so that speed adjust shoes 100 may extend in a radial direction for applying force to palm side conical surface 44 of spool assembly 32.

Figure 12:
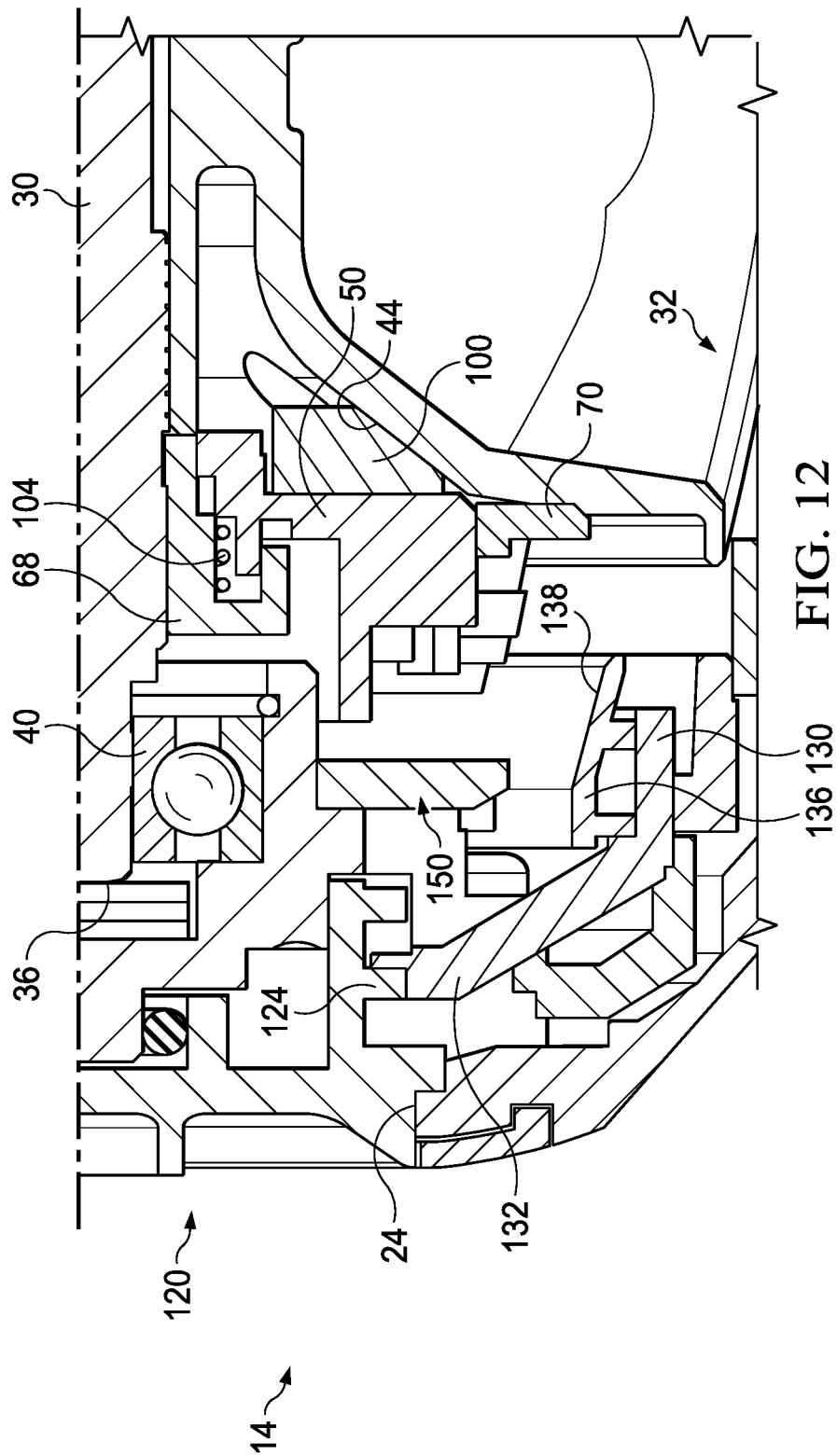
FIG. 12 is a cross-sectional elevation view of the reel of FIG. 1 showing a position of the speed adjust shoe when the reel is experiencing low-speed casting.
Figure 13:
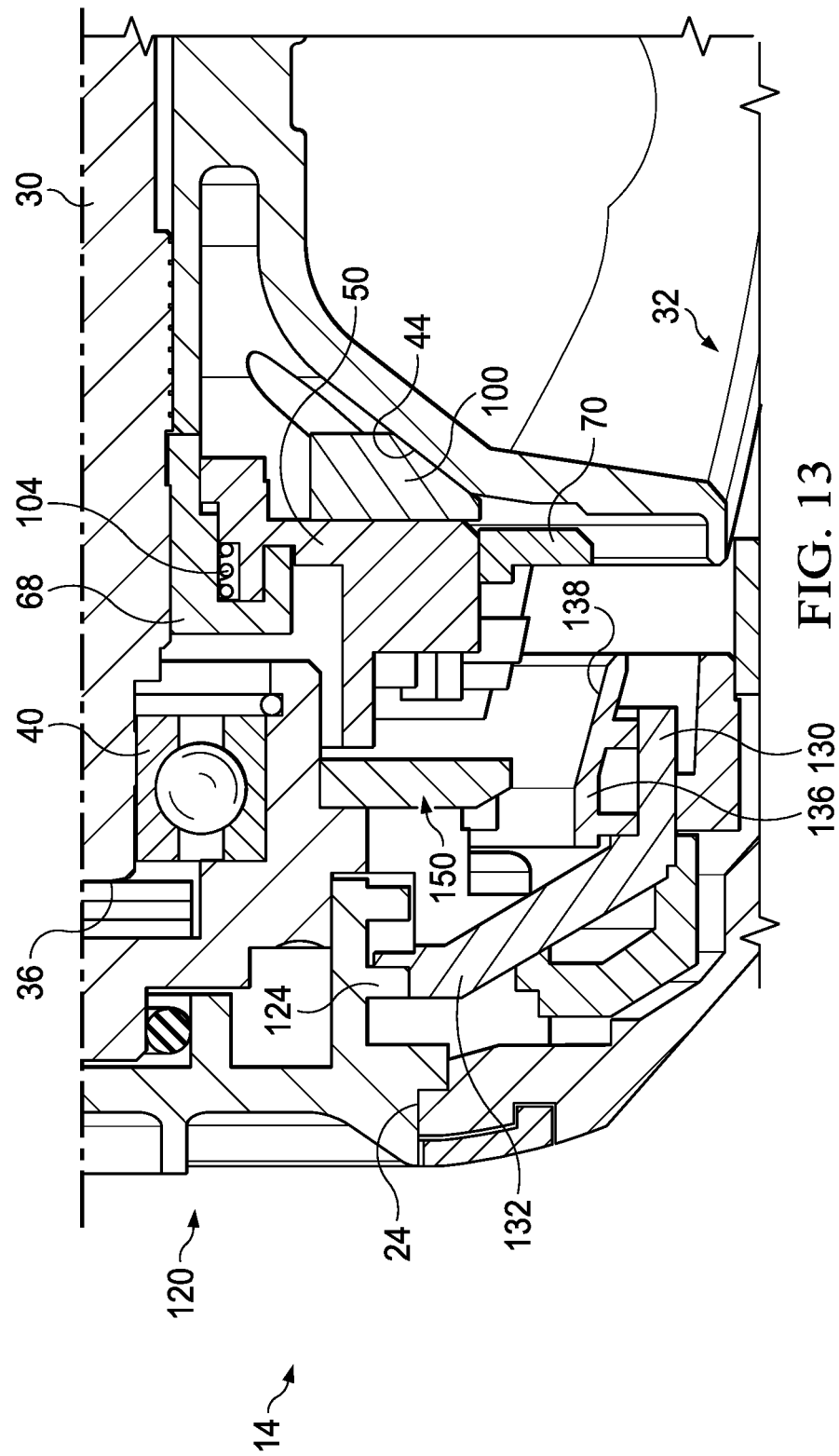
FIG. 13 is a cross-sectional elevation view of the reel of FIG. 1 showing a position of the speed adjust shoe when the reel is experiencing high-speed casting.

In greater detail, referring to FIGS. 12 and 13, when spool assembly 32 spins at a high speed when casting, speed adjust shoes 100 move outwardly and push against palm side conical surface 44 of spool assembly 32. The outwardly directed force of auto speed adjust shoes 100 causes speed adjust shoes 100 to slide along palm side conical surface 44 outwardly and also to slide axially in the direction of brake ring support 130 i.e., towards palm side 14. Brake shoe retainer 50, therefore, moves toward palm side 14 of reel 10 when the axial vector force is greater than the spring force from speed adjust spring 104. Braking force is generated when brake shoes 90 move to engage brake ring 136, as shown in FIGS. 10 and 11.

Referring now to the section views of FIGS. 10-13, it can be seen that FIG. 12 shows reel 10 at a low speed casting position. In this position, speed adjust shoes 100 are in a fully retracted position within speed shoe retainers 76 and in contact with palm side conical surface 44 of spool assembly 32. Brake shoe retainer 50 is pressed towards gear side 16, i.e., by speed adjust spring 104 (see FIG. 3). Brake shoes 90 do not make contact with sloped brake shoe engaging surface 138 of brake ring 136.

FIG. 13 shows reel 10 at a casted high speed condition. In the position shown in FIG. 13, centrifugal force extends speed adjust shoes 100 from speed shoe retainers 76. An outside surface of speed adjust shoes 100 contact palm side conical surface 44 of spool assembly 32. Speed adjust shoes 100, therefore, provide an axial force component for moving brake shoe retainer 50 towards palm side 14 of reel 10. Brake shoes 90 are likewise extended from brake shoe receptacles 74 and contact sloped brake shoe engaging surface 138 of brake ring 136.

FIG. 11 shows reel 10 at a casted high speed position. In the position shown in FIG. 11, speed adjust shoes 100 are extended from speed shoe retainers 76. An outside surface of speed adjust shoes 100 contact palm side conical surface 44 of spool assembly 32. Speed adjust shoes 100, therefore, provide an axial force component for moving brake shoe retainer 50 toward palm side 14 of reel 10. Brake shoes 90 are likewise extended from brake shoe receptacles 74 and make frictional braking contact with sloped brake shoe engaging surface 138 of brake ring 136 to provide a braking force.

Figure 14:
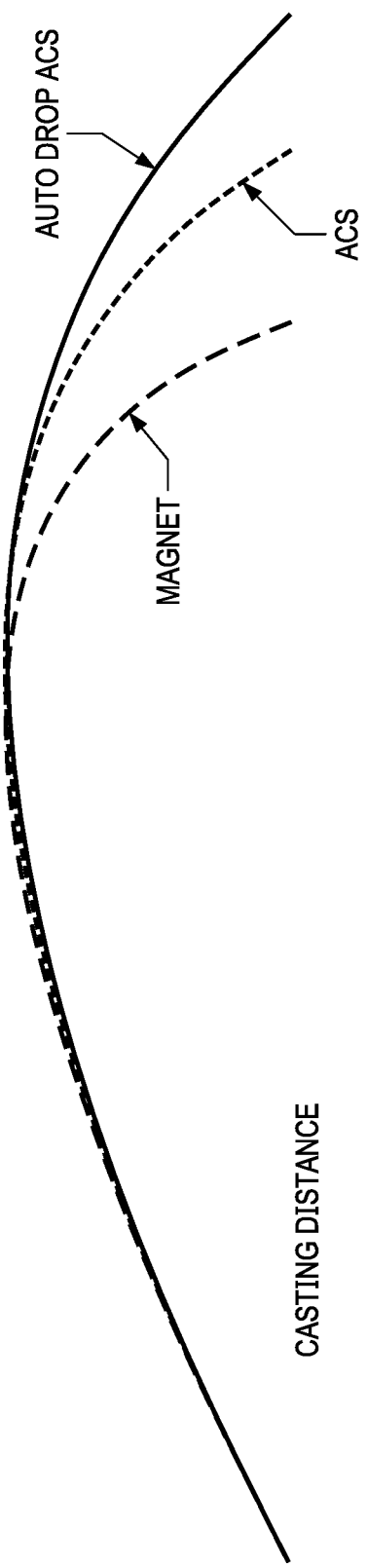
FIG. 14 is a schematic showing relative casting distances for each of magnet, ACS, and auto-drop ACS braking systems.

Referring to FIG. 14, it can be seen that casting distance is affected by magnetic braking systems. Centrifugal braking systems have less effect on casting distance than magnetic braking systems. The reel of the invention, which utilizes speed adjusting shoes 100, a/k/a "auto drop" shoes, has the smallest impact on casting distance of the three systems.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A reel comprising:
a spool assembly mounted on a spool shaft;
a brake assembly slidably mounted on the spool shaft, the brake assembly defining a radially oriented rail;
a brake shoe defining a channel for receiving the radially oriented rail, wherein the brake shoe is slidably mounted on the rail;
a brake ring proximate to the brake assembly;
wherein the brake shoe extends radially from the brake assembly when the brake assembly is rotated.

2. The reel according to claim 1 wherein:
the rail defines a stop; and
the brake shoe defines a narrowed area within the channel for engaging the stop for limiting radial travel of the brake shoe.

3. The reel according to claim 2 wherein:
the rail defines a narrow section and a wide section;
the wide section having a greater width than the narrowed area of the channel for limiting radial travel of the brake shoe.

4. The reel according to claim 1 further comprising:
a speed adjust shoe slidably affixed to the brake assembly;
a conical surface for selectively engaging the speed adjust shoe;
wherein the speed adjust shoe migrates outwardly in contact with the conical surface when the brake assembly is spun with sufficient velocity and the speed adjust shoe imparts an axial force to the brake assembly for moving the brake assembly towards the brake ring.

5. The reel according to claim 4 wherein:
the conical surface is part of the spool assembly.

6. The reel according to claim 4 further comprising:
a holder proximate a palm side end of the spool shaft;
a speed adjust spring having a first end in contact with the holder and having a second end in contact with the brake assembly, the speed adjust spring for biasing the brake assembly away from the brake ring and towards the spool assembly;
wherein the speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring.

7. The reel according to claim 1 further comprising:
a brake control dial;
braking force resulting from the brake shoe against the brake ring is adjustable by the brake control dial.

8. The reel according to claim 7 wherein:
the brake control dial defines a camming surface;
the brake ring has a plurality of cam follower tabs for engaging the camming surface so that a position of the brake ring can be adjusted by the brake control dial;
wherein the cam follower tabs are biased against the camming surface by springs.

9. The reel according to claim 8 further comprising:
a brake spring retainer having a base and a plurality of posts that extend from the base; and wherein
each of the springs surrounds one of the plurality of posts;
wherein the springs are maintained in a parallel relationship by the posts when the springs are compressed.

10. The reel according to claim 1 wherein:
the brake assembly is keyed to the spool assembly for ensuring that the brake assembly and the spool assembly rotate together.

11. The reel according to claim 10 further comprising:
a retaining post extending from the spool assembly;
a post receiving orifice defined by the brake assembly for receiving the retaining post, wherein engagement of the retaining post and the post receiving orifice keys the brake assembly to the spool assembly.

12. A reel comprising:
a spool assembly mounted on a spool shaft;
a brake assembly slidably mounted on the spool shaft;
a brake shoe and a speed adjust shoe slidably retained in the brake assembly;
a brake ring proximate to the brake assembly;
a conical surface proximate to the brake assembly;
wherein the brake shoe extends radially from the brake assembly when the brake assembly is rotated;
a holder proximate a palm side of the spool shaft, said holder having a central portion defining a central orifice for receiving said spool shaft, said holder having a radial portion extending outwardly from said central portion, said holder having an annular lip surrounding an outside of said radial portion;
a speed adjust spring having a first end in contact with said radial portion of the holder and having a second end in contact with the brake assembly, the speed adjust spring for biasing the brake assembly away from the brake ring and towards the spool assembly;
wherein the speed adjust shoe is sized so that the speed adjust shoe applies a centrifugal force against the conical surface when the brake assembly is rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring.

13. The reel according to claim 12 wherein:
the brake assembly defines a radially oriented rail;
the brake shoe defines a channel for receiving the radially oriented rail, wherein the brake shoe is slidably mounted on the rail.

14. The reel according to claim 13 wherein:
the rail defines a stop; and
the brake shoe defines a narrowed area within the channel for engaging the stop for limiting radial travel of the brake shoe.

15. The reel according to claim 14 wherein:
the rail defines a narrow section and a wide section;
the wide section has a greater width than the narrowed area of the channel for limiting radial travel of the brake shoe.

16. The reel according to claim 12 wherein:
the speed adjust shoe migrates outwardly in contact with the conical surface when the brake assembly is spun with sufficient velocity and the speed adjust shoe imparts an axial force to the brake assembly for moving the brake assembly towards the brake ring.

17. The reel according to claim 12 wherein:
the conical surface is part of the spool assembly.

18. The reel according to claim 12 further comprising:
a brake control dial; and wherein
braking force resulting from the brake shoe against the brake ring is adjustable by the brake control dial.

19. The reel according to claim 18 wherein:
the brake control dial defines a camming surface;
the brake ring has a plurality of cam follower tabs for engaging the camming surface so that a position of the brake ring can be adjusted by the brake control dial;
wherein the cam follower tabs are biased against the camming surface by springs.

20. The reel according to claim 19 further comprising:
a brake spring retainer having a base and a plurality of posts that extend from the base; and wherein
each of the springs surrounds one of the plurality of posts;
wherein the springs are maintained in a parallel relationship by the posts when the springs are compressed.

21. The reel according to claim 12 wherein:
the brake assembly is keyed to the spool assembly for ensuring that the brake assembly and the spool assembly rotate together.

22. The reel according to claim 21 further comprising:
a retaining post extending from the spool assembly;
a post receiving orifice defined by the brake assembly for receiving the retaining post, wherein engagement of the retaining post and the post receiving orifice keys the brake assembly to the spool assembly.

23. A reel comprising:
a spool assembly mounted on a spool shaft;
a brake assembly slidably mounted on the spool shaft;
wherein the brake assembly is keyed to the spool assembly for ensuring that the brake assembly and the spool assembly rotate together;
a brake shoe slidably received in the brake assembly;
a brake ring proximate to the brake assembly;
wherein the brake shoe extends radially from the brake assembly when the brake assembly is rotated for engaging the brake ring;
the brake assembly defines a radially oriented rail;
the brake shoe defines a channel for receiving the radially oriented rail, wherein the brake shoe is slidably mounted on the rail.

24. The reel according to claim 23 wherein:
the rail defines a stop; and
the brake shoe defines a narrowed area within the channel for engaging the stop for limiting radial travel of the brake shoe.

25. The reel according to claim 24 wherein:
the rail defines a narrow section and a wide section;
the wide section has a greater width than the narrowed area of the channel for limiting radial travel of the brake shoe.

26. The reel according to claim 23 further comprising:
a speed adjust shoe slidably retained by the brake assembly;
a conical surface for selectively engaging the speed adjust shoe;
wherein the speed adjust shoe migrates outwardly for contacting the conical surface when the brake assembly is spun with sufficient velocity and the speed adjust shoe imparts an axial force to the brake assembly for moving the brake assembly towards the brake ring.

27. The reel according to claim 26 wherein:
the conical surface is part of the spool assembly.

28. The reel according to claim 26 further comprising:
a holder proximate a palm side end of the spool shaft;
a speed adjust spring having a first end in contact with the holder and having a second end in contact with the brake assembly, the speed adjust spring for biasing the brake assembly away from the brake ring and towards the spool assembly.

29. The reel according to claim 28 wherein:
said speed adjust shoe is slidably retained in the brake assembly; and
wherein the speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring.

30. The reel according to claim 23 further comprising:
a brake control dial;
braking force resulting from the brake shoe against the brake ring is adjustable by the brake control dial.

31. The reel according to claim 30 wherein:
the brake control dial defines a camming surface;
the brake ring has a plurality of cam follower tabs for engaging the camming surface so that a position of the brake ring can be adjusted by the brake control dial;
wherein the cam follower tabs are biased against the camming surface by springs.

32. The reel according to claim 31 further comprising:
a brake spring retainer having a base and a plurality of posts that extend from the base; and wherein
each of the springs surrounds one of the plurality of posts;
wherein the springs are maintained in a parallel relationship by the posts when the springs are compressed.

33. The reel according to claim 23 wherein:
the brake assembly is keyed to the spool assembly for ensuring that the brake assembly and the spool assembly rotate together.

34. The reel according to claim 33 further comprising:
a retaining post extending from the spool assembly;
a post receiving orifice defined by the brake assembly for receiving the retaining post, wherein engagement of the retaining post and the post receiving orifice keys the brake assembly to the spool assembly.

35. A reel comprising:
a spool assembly mounted on a spool shaft;
a brake assembly slidably mounted on the spool shaft;
a brake shoe slidably retained in the brake assembly wherein the brake shoe is radially extendible from the brake assembly when the brake assembly is rotated;
a brake ring proximate to the brake assembly, the brake ring defining a cam follower;
a brake control dial defining an outwardly facing camming surface for engaging the cam follower of the brake ring, the brake control dial for axially adjusting a position of the brake ring for controlling a braking force resulting from the brake shoe against the brake ring;
wherein the cam follower is biased against the camming surface by springs;
a brake spring retainer having a base and a plurality of posts that extend from the base towards a palm side cover assembly of the reel and wherein each of the springs surrounds one of the plurality of posts;
wherein the springs are maintained in a parallel relationship by the posts when the springs are compressed.

36. The reel according to claim 35 wherein:
the brake assembly defines a radially oriented rail;
the brake shoe defines a channel for receiving the radially oriented rail, wherein the brake shoe is slidably mounted on the rail.

37. The reel according to claim 36 wherein:
the rail defines a stop; and
the brake shoe defines a narrowed area within the channel for engaging the stop for limiting radial travel of the brake shoe.

38. The reel according to claim 37 wherein:
the rail defines a narrow section and a wide section;
the wide section has a greater width than the narrowed area of the channel for limiting radial travel of the brake shoe.

39. The reel according to claim 35 further comprising:
a speed adjust shoe slidably affixed to the brake assembly;
a conical surface for selectively engaging the speed adjust shoe;
wherein the speed adjust shoe migrates outwardly in contact with the conical surface when the brake assembly is spun with sufficient velocity and the speed adjust shoe imparts an axial force to the brake assembly for moving the brake assembly towards the brake ring.

40. The reel according to claim 39 wherein:
the conical surface is part of the spool assembly.

41. The reel according to claim 39 further comprising:
a holder proximate a palm side end of the spool shaft;
a speed adjust spring having a first end in contact with the holder and having a second end in contact with the brake assembly, the speed adjust spring for biasing the brake assembly away from the brake ring and towards the spool assembly;
wherein the speed adjust shoe is sized so that the speed adjust shoe applies a centrifugal force against the conical surface when rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring.

42. The reel according to claim 35 wherein:
the brake assembly is keyed to the spool assembly for ensuring that the brake assembly and the spool assembly rotate together.

43. The reel according to claim 42 further comprising:

a retaining post extending from the spool assembly;

a post receiving orifice defined by the brake assembly for receiving the retaining post, wherein engagement of the retaining post and the post receiving orifice keys the brake assembly to the spool assembly.

44. A reel comprising:

a spool assembly mounted on a spool shaft;

a brake assembly slidably mounted on the spool shaft;

a brake shoe and a speed adjust shoe slidably retained in the brake assembly;

a brake ring proximate to the brake assembly;

a conical surface proximate to the brake assembly;

wherein the brake shoe extends radially from the brake assembly when the brake assembly is rotated;

a holder proximate a palm side of the spool shaft;

a speed adjust spring having a first end in contact with said radial portion of the holder and having a second end in contact with the brake assembly, the speed adjust spring for biasing the brake assembly away from the brake ring and towards the spool assembly;

wherein the speed adjust shoe is sized so that the speed adjust shoe applies a centrifugal force against the conical surface when the brake assembly is rotated, thereby causing the brake assembly to move towards the brake ring, and wherein the speed adjust shoe provides a lesser centrifugal force against the conical surface at relatively lower rotational speeds thereby causing the speed adjust spring to push the brake assembly away from the brake ring;

the brake assembly defines a radially oriented rail;

the brake shoe defines a channel for receiving the radially oriented rail, wherein the brake shoe is slidably mounted on the rail.

45. The reel according to claim 44 wherein:

the rail defines a stop; and the brake shoe defines a narrowed area within the channel for engaging the stop for limiting radial travel of the brake shoe.

46. The reel according to claim 45 wherein:

the rail defines a narrow section and a wide section;

the wide section has a greater width than the narrowed area of the channel for limiting radial travel of the brake shoe.

47. A reel comprising:

a spool assembly mounted on a spool shaft;

a brake assembly slidably mounted on the spool shaft;

a brake shoe slidably retained in the brake assembly wherein the brake shoe is radially extendible from the brake assembly when the brake assembly is rotated;

a brake ring proximate to the brake assembly, the brake ring defining a cam follower;

a brake control dial defining a camming surface for engaging the cam follower of the brake ring, the brake control dial for axially adjusting a position of the brake ring for controlling a braking force resulting from the brake shoe against the brake ring;

wherein the cam follower is biased against the camming surface by springs;

a brake spring retainer having a base and a plurality of posts that extend from the base and wherein each of the springs surrounds one of the plurality of posts;

wherein the springs are maintained in a parallel relationship by the posts when the springs are compressed;

the brake assembly defines a radially oriented rail;

the brake shoe defines a channel for receiving the radially oriented rail, wherein the brake shoe is slidably mounted on the rail.

48. The reel according to claim 47 wherein:

the rail defines a stop; and the brake shoe defines a narrowed area within the channel for engaging the stop for limiting radial travel of the brake shoe.

49. The reel according to claim 48 wherein:

the rail defines a narrow section and a wide section;

the wide section has a greater width than the narrowed area of the channel for limiting radial travel of the brake shoe.

\* \* \* \* \*